(12) United States Patent
Kunz

(10) Patent No.: US 12,472,523 B2
(45) Date of Patent: Nov. 18, 2025

(54) CLEANING DEVICE FOR AIRLESS PAINT SPRAYING EQUIPMENT AND METHOD THEREFOR

(71) Applicant: Heinrich Kunz, Elzach (DE)

(72) Inventor: Heinrich Kunz, Elzach (DE)

(*) Notice: Subject to any disclaimer, the term of this patent is extended or adjusted under 35 U.S.C. 154(b) by 350 days.

(21) Appl. No.: 17/786,337

(22) PCT Filed: Dec. 18, 2020

(86) PCT No.: PCT/IB2020/062221
§ 371 (c)(1),
(2) Date: Jun. 16, 2022

(87) PCT Pub. No.: WO2021/124274
PCT Pub. Date: Jun. 24, 2021

(65) Prior Publication Data
US 2023/0023340 A1    Jan. 26, 2023

(30) Foreign Application Priority Data
Dec. 19, 2019   (DE) .................. 10 2019 135 118.9

(51) Int. Cl.
B05B 15/555     (2018.01)

(52) U.S. Cl.
CPC ............... B05B 15/555 (2018.02)

(58) Field of Classification Search
None
See application file for complete search history.

(56) References Cited

U.S. PATENT DOCUMENTS

| | | | | |
|---|---|---|---|---|
| 4,827,955 A | * | 5/1989 | Stern | B05B 15/555 134/169 R |
| 4,923,522 A | * | 5/1990 | Sowers | B05B 14/43 134/200 |
| 2013/0042895 A1 | * | 2/2013 | Beijbom | B05B 15/55 29/559 |
| 2016/0045077 A1 | * | 2/2016 | Wade | G05D 9/02 137/151 |

FOREIGN PATENT DOCUMENTS

| | | | | |
|---|---|---|---|---|
| CN | 102541100 B | | 12/2015 | |
| DE | 2747707 A1 | * | 4/1979 | ............... B05B 7/24 |
| DE | 69102714 T2 | | 12/1994 | |
| DE | 197 30 034 A1 | | 11/1999 | |
| DE | 20 2018 003 530 U1 | | 11/2019 | |
| GB | 2 182 266 A | | 5/1987 | |

OTHER PUBLICATIONS

J. Wagner GmbH: Betriebsanleitung—Airless Hochdruck-Spritzgeräte. Ausg. Apr. 2003 D. Markdorf, 2003.—Firmenschrift.

* cited by examiner

Primary Examiner — Kaj K Olsen
Assistant Examiner — Pradhuman Parihar
(74) Attorney, Agent, or Firm — Raymond Wagenknecht; Biotech Beach Law PC

(57) ABSTRACT

An apparatus for cleaning airless sprayers having an upwardly open container for receiving fresh water, as well as an inlet connectable to a water supply, and is characterized in that the container has a level control by means of which the level of the fresh water in the container can be maintained at a predetermined value, and in that the inlet opens into at least one nozzle, by means of which fresh water can be discharged in a directed manner into the interior of the container.

13 Claims, 2 Drawing Sheets

CLEANING DEVICE FOR AIRLESS PAINT SPRAYING EQUIPMENT AND METHOD THEREFOR

CROSS-REFERENCE TO RELATED APPLICATIONS

This is a US national phase entry under 35 U.S.C. § 371 of international patent application no. PCT/IB2020/062221 filed Dec. 18, 2020, which claims priority to German patent application no. 10 2019 135 118.9, filed Dec. 19, 2019; each of which is herein incorporated by reference in its entirety.

TECHNICAL FIELD OF THE INVENTION

The invention relates to a device and a method for cleaning paint spraying equipment. In particular, the invention relates to a device and a method for cleaning airless paint spraying equipment.

BACKGROUND OF THE INVENTION

Paint sprayers are well known from the prior art. The liquid to be applied (paint, stain, adhesive, . . . ) contained in a container or tank is conveyed into a spray gun and atomized from a nozzle. The basic mechanism here is the pressure difference between the liquid and the environment.

Paint sprayers have been known for some time in which the liquid is conveyed out of the nozzle by means of pressurized air and thus atomized. The advantage of very fine droplet formation is offset by the disadvantage of a fairly extensive spray mist. In addition, bubbles are formed on the wetted surface due to the air contained in the liquid.

A variant that has recently enjoyed strong growth in popularity is the so-called airless spraying technique. Here, the liquid is put under high pressure (50 to 250 bar) by means of a hydraulic pump, without air being supplied. When the liquid exits the nozzle, it is atomized. Advantages of this technology include lower consumption due to less spray mist formation, as well as the higher possible throughput. However, airless equipment must be cleaned particularly thoroughly so that the especially sensitive high-pressure components do not stick together after use due to paint residues, rendering the machines, which are expensive compared to other spraying equipment, unusable.

So far, the cleaning of said airless equipment is done as follows:

First, several containers of clean (tap) water are provided, previously filled at a frequently remote tap. The provision of several containers is necessary because the total amount of liquid required for cleaning can be up to 40 liters or more, exceeding the weight that can be carried by an average person at one time. In some circumstances, up to four 25-liter containers may be used. The cleaning container itself must have a relatively large volume (at least 10-15 liters), otherwise it would be drained too soon. During the subsequent cleaning process, there is also no time to refill a single container at the tap, unless the cleaning process would be interrupted, which, however, is undesirable. If several containers are available for refilling, it may be necessary to have another person ready to refill the container in which the cleaning is taking place; moreover, it is fundamentally impractical to add water by refilling while cleaning is in progress.

Then the suction line of the airless sprayer, the so-called (suction) "sprout", which is placed upstream of the high-pressure pump to suck in the liquid to be sprayed, is hung in a first bucket (cleaning container).

The end downstream of the high-pressure pump (spray nozzle) is also suspended in a previously provided container so that the gray liquid produced during the actual cleaning process can be collected; direct discharge into the sewer system is not permissible. It is clear that, advantageously, a sufficient number of such collecting containers must be available so that the entire cleaning liquid can also be collected.

The high-pressure pump is then switched on. The clear water is conveyed through the spraying device, where it gradually cleans the interior of the lines and the high-pressure pump. The outside of the sprout, which is often soiled with heavy paint residues, is wiped off manually, if necessary with a brush, in the fresh water until it is clean. It is clear that only after the sprout has been completely cleaned, really clear water is available at all, which is however needed to actually clean the spraying equipment thoroughly.

The cleaning process is only complete when clear water emerges from the nozzle.

This approach has a number of disadvantages.

Firstly, the amount of water required for cleaning is very high. The frequent need to carry the fresh water containers is tiring, and the containers present obstacles that may well become trip hazards in a workshop or on a construction site. The same applies to the collection containers. In addition, bacteria can settle in the stagnant water, which can lead to odors and health problems.

SUMMARY OF THE INVENTION

Accordingly, the object of the invention is to provide a device and a method which avoids the disadvantages of the prior art.

In a first aspect of the invention, an apparatus for cleaning airless spraying equipment is provided. It includes an upwardly open container for receiving fresh water, as well as an inlet which can be connected to a water supply, and is characterized in that the container has a level control by means of which the level of the fresh water in the container can be maintained at a predetermined value.

The container is open at the top in such a way that the "sprout" soiled with paint or other liquid can be immersed in the container, preferably to such an extent that the soiled parts can be completely immersed in the container filled with water.

The inlet may be designed as a component (bore) passing through the wall of the container. However, it can also be provided by a component that extends over the rim of the container and is oriented so that the water exits into the interior of the container. Accordingly, the mouth of the inlet may be located below or above the rim of the container; a mouth located below is preferred. The inlet may be mechanically connected to, and also integrated with, the level control described below.

The level control comprises two subcomponents, namely a measurement unit and a control unit. The measurement unit is used to measure the actual level, or to determine whether a predetermined setpoint has been reached or not. The control unit is used to selectively open or close the inlet by means of a valve or the like. It receives the signal to open exactly when the measurement unit detects that the level has fallen below the setpoint. Fresh water thus flows into the container until the setpoint is reached again. The measurement unit detects this condition and the signal to open is switched off or the signal to close is sent to the control. The inlet is closed.

The control can have two states (closed/open), or several (intermediate) states (closed/slightly open/half open/wide open/fully open), or be provided as proportional control (valve position depends on the value of the setpoint deviation).

A simple control has a float which is coupled to a valve and closes it as soon as it has reached a certain height above the container bottom (level) due to the rising water. A particularly robust control is one that includes a pressure cell with a diaphragm, whereby the same is triggered in the event of overflushing. The control may also include electronic components (e.g. conductivity measurement between two conductors protruding into the water), etc.

Furthermore, the apparatus according to the invention is characterized in that the inlet opens into at least one nozzle, by means of which fresh water can be discharged into the container interior in a directed manner. The term "nozzle" indicates that the velocity of the emerging water is increased, and/or the direction of the resulting water jet can be determined by means of alignment of the nozzle. The term "nozzle" is to be understood broadly in the present context; accordingly, this definition covers any orifice which serves the purposeful discharge of fresh water (or another cleaning liquid), in which case the flow velocity is particularly preferably increased, for example by means of a cross-sectional taper. A velocity at the outlet of the nozzle of 0.5 to 5 m/s, preferably of 2 to 4 m/s, at a flow rate of 0.1 l/s to 1.0 l/s, preferably of 0.3 l/s to 0.6 l/s, has proved advantageous.

The provision of a nozzle further enhances the formation of the desired turbulence. In addition, the cleaning effect at the sprout is better by a harder, directed jet than by water introduced arbitrarily. Particularly preferably, the at least one nozzle is directed toward the sprout, i.e., approximately toward the center of the container. To avoid splashing out of the water, the water jet may also be directed slightly downward. Also preferably, the nozzle is arranged above the level, so that the jet first passes through the air, and then optimally hits the water surface in the interface region between the level and the sprout. In this way, air bubbles are entrained, which further improves the cleaning effect.

The invention effectively avoids the disadvantages known from the prior art.

The invention allows simple and very thorough cleaning of airless equipment, eliminating the need to keep several containers on hand to refill the cleaning container, as well as the need to interrupt the cleaning process to manually refill the cleaning container in the first place. Accordingly, only one person is needed to operate the apparatus.

Since the cleaning container is refilled automatically, it is not necessary for it to be as large as the cleaning containers described above. This is also associated with lower overall water consumption, as will be explained in detail.

Various embodiments of the invention are described in more detail below.

According to one embodiment, the volume of the container is between 0.5 and 20 liters, and preferably between 2 and 15 liters, and particularly preferably between 5 and 10 liters. Accordingly, the volume in particular of the preferred and the especially preferred embodiment is significantly smaller than that of the containers used in the prior art.

Due to the fact that the container fills up again very quickly when the inlet is open, the volume in the container, and thus the amount of water available there, only needs to be just large enough for the sprayer's nozzle to have sufficient space and be covered sufficiently far. Furthermore, this means that the volume in the container—assuming the same suction capacity of the sprayer—is exchanged much faster. Therefore, although the water is initially more contaminated at the very beginning of the cleaning process (smaller volume for the same amount of dirt), it is then exchanged more quickly so that it is also clean sooner. This leads to the desired reduction in water consumption.

According to one embodiment, the feed rate of fresh water is between 5 and 50 liters per minute, and preferably between 10 and 35 liters per minute, and particularly preferably between 15 and 25 liters per minute. This means that the inflow rate is relatively high. However, it should be noted that the inflow is only intermittently open, since water is only supplied when the level falls below. Accordingly, the feed rate says nothing about the actual water consumption, which is actually smaller in the present invention than in prior art methods.

Typically, the control has a hysteresis. This means that slightly more water than necessary to reach the target level is filled and/or that the inlet is only opened when the fill level falls slightly below the target level. Accordingly, there exists a range between the upper and lower limits of which water is withdrawn by the sprayer without immediate refilling. It is clear that the inflow rate must be at least slightly greater than the withdrawal rate (pumping rate in liters per minute) of the sprayer so that the target level can also always be reached again without the pump of the sprayer having to be switched off temporarily.

The advantages of a low volume of the container together with a high feed rate, which is particularly preferred to be intermittent, are as follows:

A high feed rate allows a further reduction of the container volume, since even a very small container can always be refilled to the target level sufficiently quickly.

If the feed rate is particularly high, it is sufficient that the water is only fed in pulses, which are, however, correspondingly strong. These pulses cause sediment, which could otherwise collect at the bottom, to be stirred up again and again and conveyed out of the container by the sprayer pump.

The swirls and turbulence in the water prevent paint or other residues from adhering to the inside of the container; at a low rate of change of the fill level, as is more likely the case with large containers used in the prior art, rings quickly form at the interface layer between the liquid, air and container wall; these only gradually dissolve again, resulting in a significantly longer period of time over which there is not completely clean water in the container, so that the sprayer also has really clear water flowing through it correspondingly late and is thus completely cleaned. In addition, the turbulence also causes sediment to be whirled up, which is then transported away together with the gray water. This also prevents the formation of unpleasant odors due to sediment deposition.

According to a further embodiment, the diameter (or diagonal, as the case may be) of the (preferably round or rectangular) container is between 10 and 100 centimeters, and preferably between 20 and 50 centimeters, and particularly preferably between 25 and 30 centimeters. Accordingly, the diameter is small compared to prior art containers, which is accompanied by a correspondingly smaller volume.

The level control is set up to maintain a level of 5 to 30 centimeters, and preferably 8 to 20 centimeters, and particularly preferably 10 to 15 centimeters, measured from the container bottom. The optimum filling level is also determined by the typical level in paint containers and the like, since up to their filling level contamination of the nozzle of the sprayer is to be expected. It therefore makes sense to also keep the water, which cleans said liquid, at a comparable fill level in the container.

According to one embodiment, the level height may be adjustable.

The height of the container is preferably between 2 and 25, preferably between 4 and 20, and particularly preferably between 5 and 15 centimeters more than the desired level. Typically, the container is preferably between 20 and 30 centimeters high overall. A container whose top edge is too close to the desired level tends to spill over; moreover, it is advantageous if the jet exiting the inlet initially passes through the air, and also hits the water from the air in the interface area between the sprout and the level. This requires a rather high rim, or a rather large distance from the top edge of the container to the target level. According to another preferred embodiment, the inlet discharges into a plurality of nozzles. Thus, each nozzle can have a smaller cross-section, resulting in a more directional jet; by having multiple nozzles discharging water in parallel, the required feed rate can still be achieved. In addition, multiple nozzles allow the sprout to be cleaned at multiple locations (e.g., multiple levels) simultaneously. One nozzle, preferably the one closest to the bottom, can also be tilted sideways to create a circulating vortex at the bottom, which is even more effective in stirring up sediments.

The nozzles can be arranged in vertical and/or circumferential direction on the inner wall of the container.

When arranged in a vertical direction, the sprout can be cleaned particularly effectively in several planes at the same time. If necessary, the sprout or the container must be rotated to allow cleaning of all sides.

When arranged in a circumferential direction, the sprout can be cleaned particularly effectively from all sides at the same time. If necessary, the sprout must be raised to allow cleaning in all planes.

A combination of vertically and circumferentially arranged nozzles is also possible. In this way, a device can be provided which does not require the sprout to be moved and cleans it on all sides and along its entire length.

According to a further embodiment, the inlet, possibly with the at least one nozzle, and the level control are connected to each other and can be moved in vertical and/or horizontal direction. This means that both components are attached to a rail, an elevator or the like, so that the height above the tank bottom can be varied. It is clear that the position should not change automatically once the adjustment has been made.

The advantage of this embodiment is that a dirty suction end can be cleaned along its entire length without having to move (lift) it vertically; instead, it remains in its original position in the container, and cleaning takes place by vertically "moving along" the suction end by moving the nozzle/level control-unit. Since the nozzle, which is already optimally aligned according to the invention, moves with it, there is no need for readjustment of the same. By raising the level, the end section of the suction end is cleaned first, followed successively by cleaning of the sections closer to the pump. Since the level moves along, it is always optimally adjusted in relation to the point of impact of the jet. Of course, it is also possible to start with a high level and then lower it. Thus, at the end of this process (suction end completely cleaned), the residual volume in the container is minimal, which is again advantageous (see above).

Alternatively or additionally, the nozzle level control unit can also be moved horizontally.

In the event that the nozzle/level control-unit comprises several nozzles, these can be arranged with fixed or variable spacing from one another. In this way—depending on the size and degree of contamination of the suction end—a concentration of the jets on a smaller area, or a distribution over a larger area can be achieved.

According to a further embodiment, the device comprises a carrying handle arranged to be vertically above the inlet, the handle being fixedly connected to the container and shaped so that its gripping surface is above the center of gravity of the container.

As the handle is firmly connected to the container (i.e. cannot be folded), it is always in the same position. It is thus positioned above the inlet at all times, so that the inlet with its parts located on the inside of the container is protected from mechanical damage by the sprout. It is therefore preferred that the level control is also positioned in the area of the inlet, as it is then also protected by said handle. This is particularly important if the level control also includes mechanical components (e.g. floats) which are mechanically sensitive and must be able to move freely.

The invention also relates to a device for cleaning airless sprayers, comprising an inlet of the type described above which can be connected to a water supply. The device is characterized in that it is provided for interacting with an upwardly open container for receiving fresh water flowing from the inlet and has a level control by means of which the level of the fresh water in the container can be maintained at a predetermined value.

Furthermore, the inlet opens into at least one nozzle, by means of which fresh water can be directed into the interior of the container.

In other words, the device comprises the components of the above-mentioned apparatus for cleaning, with the exception of the container. Instead, it is adapted to cooperate with such a container in such a way that water can be discharged through it directedly as well as in a controllable manner into the interior of the container, while at the same time the control of the level to a set value, already described in detail above, is possible. Accordingly, a device corresponding to the above-mentioned device can be created with the addition of almost any vessel such as, for example, an (empty) paint bucket.

It is clear that—insofar as no design contradictions arise—everything said with regard to the embodiments of the apparatus also applies to the device for cleaning according to the invention. In particular, this applies to the dimensions, the presence and the positioning of the one or also several nozzles, as well as the type of level control. A repetition can therefore be dispensed with.

The invention also relates to a system for cleaning airless sprayers. This comprises an apparatus for cleaning airless sprayers or a device for cleaning airless sprayers as respectively described above.

Furthermore, the system comprises a reprocessing unit for reprocessing gray water flowing from the downstream end of the airless sprayer. In other words, the system comprises all the essential components required for cleaning and subsequent reprocessing of the gray water originating from the cleaning of airless sprayers.

The invention also relates to a method of cleaning airless sprayers; reference is made to the above discussion of such equipment and the need for its thorough cleaning.

The method, which is preferably carried out by means of the above apparatus, comprises the following steps:

Providing a container for holding fresh water;

Inserting the suction end of the airless sprayer into the container;

Filling the container with fresh water to a predetermined value of the level;

Switching on the high-pressure pump of the airless sprayer so that fresh water is conveyed out of the container and through the airless sprayer, thus reducing the level;

Detecting the reduction of the level by means of a suitable measurement unit;

Opening an inlet of fresh water into the container by means of a control unit connected to the measurement unit, so that the level rises again;

Detecting the reaching of the predetermined value of the level and closing the inlet.

The result of the last four steps is that, despite the continuous withdrawal of fresh water by the airless sprayer, the level of fresh water in the container remains substantially constant. The advantages associated with this have already been explained above and therefore do not need to be repeated. The measurement unit together with the control unit is preferably implemented by a level control of the type described further above.

According to the invention, the fresh water is discharged into the container interior by means of at least one suitable nozzle arranged downstream of the inlet, preferably with the formation of turbulence.

In this way, a suction end of the airless sprayer introduced there is freed from liquid residues adhering to this suction end. In addition, sediments that would otherwise settle on the bottom of the container are stirred up and sucked in by the airless sprayer.

Furthermore, already contaminated water is continuously diluted and conveyed out of the container so that clean water is present in the container earlier. This reduces water consumption compared to the state of the art, according to which, with standing water in the cleaning container, the sprout introduced there is wiped off manually again and again until it is sufficiently cleaned, whereby experience shows, however, that spots are often overlooked which are then cleaned only later, so that even at a late point in time, when the actual cleaning seems to be already well advanced and a correspondingly large amount of water has been consumed, new dirt residues suddenly get into the water, which are sucked in and thus contaminate the actually already quite clean sprayer again.

According to another embodiment, the gray water flowing from the end of the airless sprayer located downstream of the high-pressure pump is fed to a reprocessing unit. In other words, the gray water pumped from the tank through the sprayer and exiting contaminated from the end which is provided for the spray gun is fed directly to a reprocessing unit. This eliminates the need to collect the gray water in separate containers; discharge into the sewage system is not permissible anyway for environmental protection reasons.

BRIEF DESCRIPTION OF THE DRAWINGS

The invention is explained below by way of example with the aid of figures. Thereby shows

DETAILED DESCRIPTION OF PREFERRED EMBODIMENTS

Figure 1:
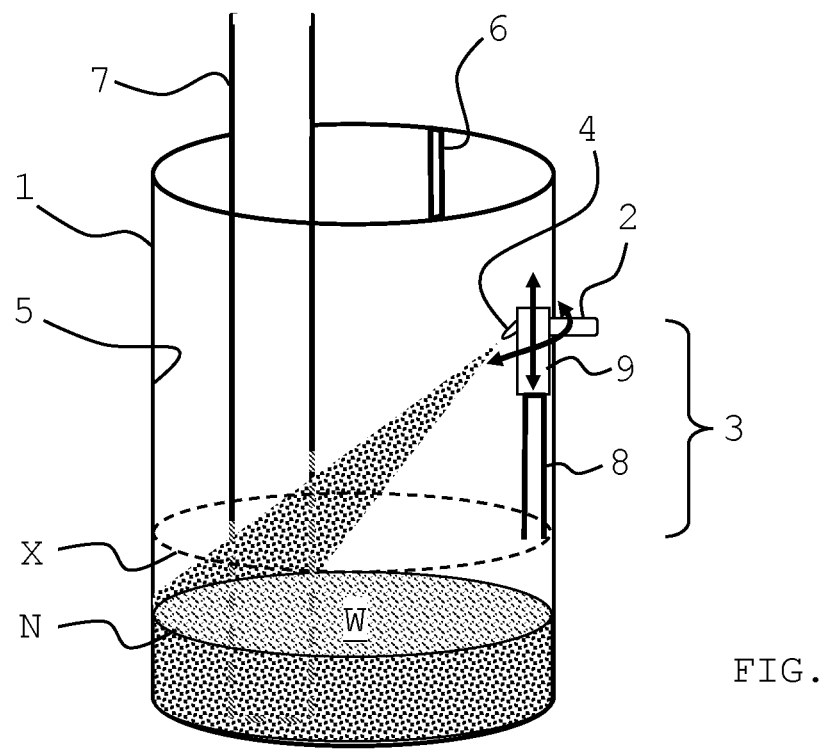
FIG. 1 is a schematic representation of an embodiment of the invention with the inlet open.

FIG. 1 shows a schematic representation of an embodiment of the invention with the inlet open.

The container 1 is round and has an inlet 2 on its inner wall 5, which is fed with fresh water W and comprises a valve (not shown). The valve is part of a control unit 9, which is connected to a measurement unit 8 that serves to measure the level N of the fresh water W in the container 1. Control unit 9 and measurement unit 8 can be combined to form level control 3. The latter is adjustable in the vertical direction, as indicated by the vertical double arrow (no reference sign). In addition, the level control 3 is also adjustable in the horizontal direction, indicated by the horizontal curved double arrow (no reference sign).

A carrying handle 6 is arranged above the measuring and control unit 8, 9. It is firmly connected to the container 1 and is positioned approximately in such a way that it protects the components underneath from mechanical damage by the suction end 7 of an airless sprayer. In the present case, the carrying handle 6 is arranged somewhat outside the center axis (not shown) of the container 1; since the inlet 2 with the measuring and control unit 8, 9 is arranged on the right side in the picture, the center of gravity of the entire apparatus also moves somewhat to the right. Accordingly, the carrying handle is arranged approximately in such a way that its gripping surface lies above the center of gravity of the container 1.

Downstream of the control unit 9, a nozzle 4 is arranged which emits a sharp and directed jet of fresh water W into the interior of the container 1 (dotted area). In the present case, the jet is directed approximately in the direction of the center and at the same time downward, in order to prevent water W from spraying out during the cleaning process.

The suction end 7 of an airless sprayer, which is not shown, projects into the interior of the container 1. Through this, water W is taken intermittently or continuously from the container 1 to be pumped through the interior of the airless sprayer and thus clean it. This would result in a continuous drop in level N unless sufficient fresh water W was supplied by means of inlet 2. Since the feed rate is greater than the extraction rate, the level N can rise again.

Figure 2:
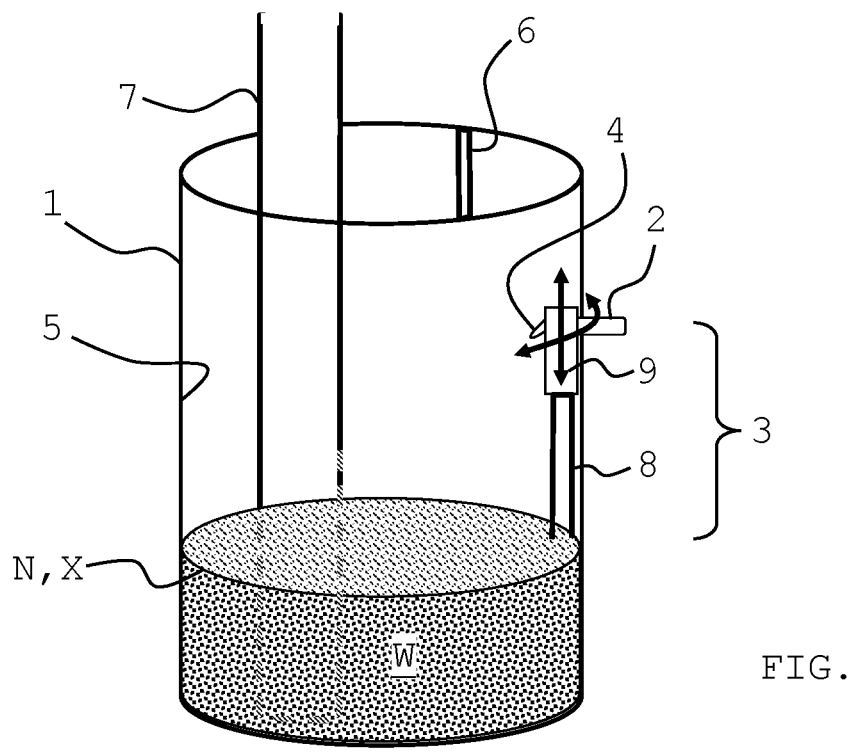
FIG. 2 depicts the design shown in FIG. 1 with the inlet closed.

FIG. 2 shows the situation after the predetermined value X of the level N has been reached. The measurement unit 8 shown comprises two wires which project towards the bottom of the container 1. As soon as they are in contact with the water W, the resistance between these wires changes, which is easily detectable and leads to closing of the valve by the control unit 9. The inlet 2 is thus closed and the jet stops.

Not shown is that the level N drops again as a result of the water W continuing to be extracted by means of the airless sprayer, if necessary, which leads to the valve being opened again, and so on.

Thus, an apparatus is provided which operates in a simple manner, yet effectively avoids the disadvantages of the prior art, and by means of which an airless sprayer can be cleaned.

Figure 3:
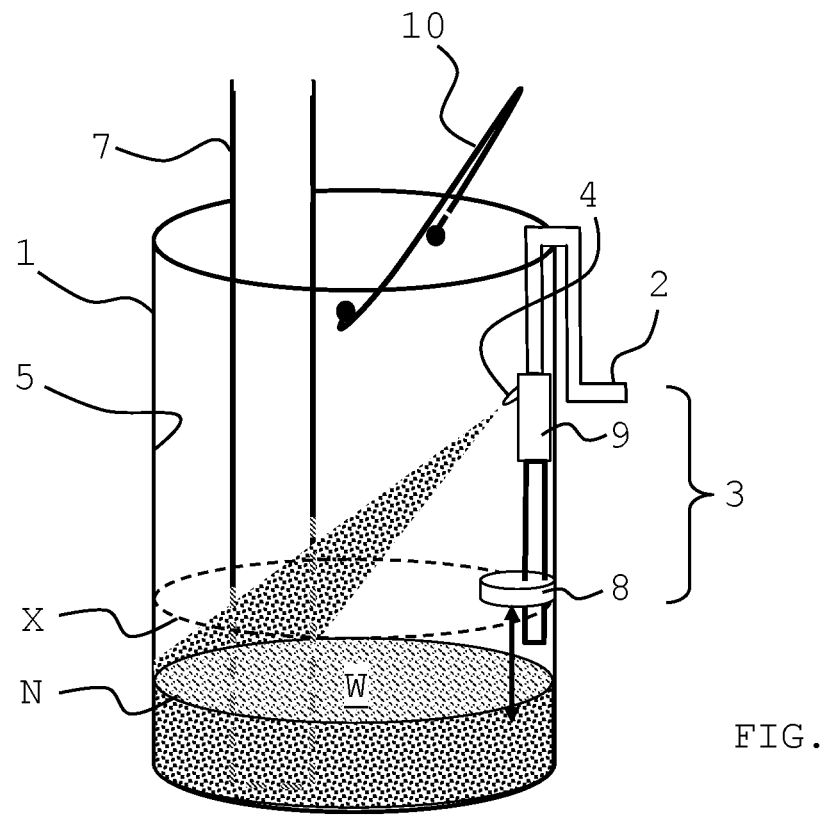
FIG. 3 depicts an embodiment of the invention with hook-in nozzle/level control-unit.

FIG. 3 shows an embodiment of the invention with an insertable nozzle/level control-unit. It comprises both the inlet 2 and the nozzle 4; in addition, the level control 3, itself comprising control unit 9 and measurement unit 8. The latter is realized in the present case by a simple pressure cell comprising a diaphragm (not shown); when the diaphragm is flushed, a switch is actuated which in turn controls the valve. The pressure cell can also be moved in the vertical direction, indicated by the double arrow (no reference sign). Thus, the desired set level can be adjusted and read very easily. The inlet 2 is arranged to be guided over the edge of the container 1 so that the unit can be hooked in. Thus, almost any container, indicated by the handle 10, can be combined with the device in a simple manner to obtain an apparatus for cleaning which is largely identical to the apparatus according to the invention.

Not shown are optional fastening means, preferably to be provided, which ensure that the nozzle/level control-unit does not move undesirably during operation.

Figure 4:
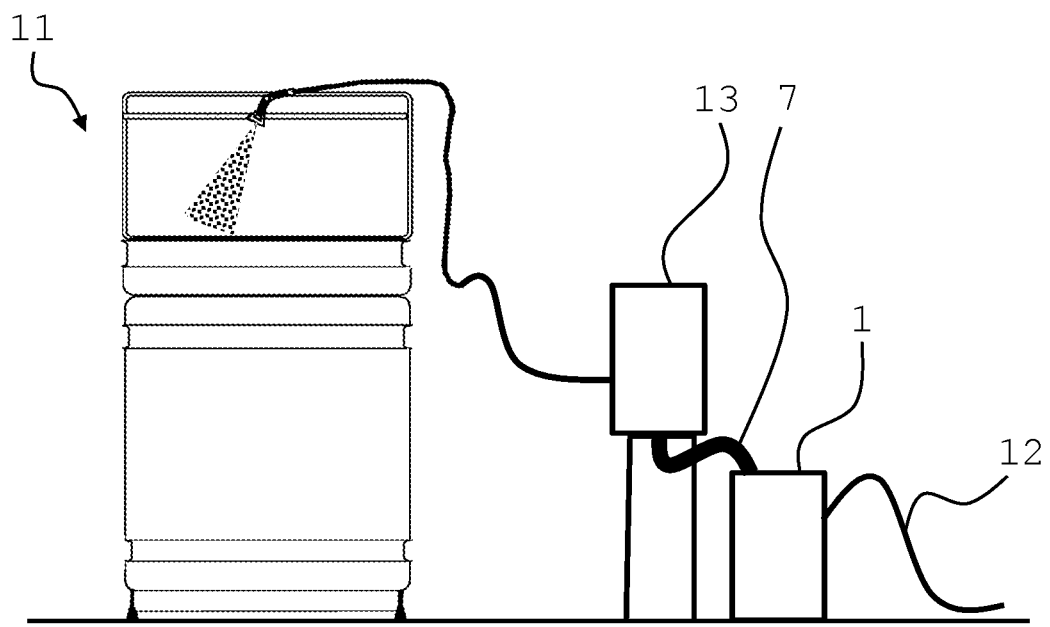
FIG. 4 depicts a system comprising the apparatus according to the invention and a reprocessing device for gray water.

FIG. 4 shows a system comprising the apparatus according to the invention and a reprocessing unit 11 for gray water. The apparatus for cleaning airless sprayers, shown on the right, is shown only roughly schematic. Fresh water is fed into the apparatus through a hose 12. Next to the apparatus, also shown roughly schematically, in the center of the picture is an airless sprayer 13, the suction end 7 of which projects into the container 1 of the apparatus, where it can be cleaned. The end of the airless sprayer 13 lying downstream of the (not shown) high-pressure pump is guided into the basin of a reprocessing device 11, which in the present case comprises a wash stand with basin. There, the graywater flowing out of this end can be collected and fed to the reprocessing unit.

All parts of the system, and in particular the device for cleaning, are placed on the floor. Accordingly, there is no need to lift the airless sprayer onto a washstand or the like. During the cleaning process, all parts also remain in the same place; the transport of fresh and/or gray water known from the prior art is completely eliminated, which also reduces the risk of tripping over containers standing around.

LIST OF REFERENCE SIGNS

1 Container
2 Inlet
3 Level control
4 Nozzle
5 Container inner wall
6 Carrying handle
7 Suction end
8 Measuring device
9 Control unit
10 Handle
11 Reprocessing unit
12 Hose
13 Airless sprayer
W Fresh water, water
N Level
X Value

What is claimed is:

1. An apparatus for cleaning inner lines and suction end (7) of airless sprayers (13), the suction end (7) being positioned upstream of an airless sprayers' (13) high-pressure pump, the apparatus comprising an upwardly open container (1) without a cover and having a volume between 0.5 and 20 liters, for receiving fresh water (W), into which the suction end (7) of an airless sprayer (13) can be inserted and remains open during cleaning, and an inlet (2) which can be connected to a water supply, wherein the container (1) has a level control (3) by means of which a level (N) of the fresh water (W) in the container (1) can be maintained at a predetermined value (X), characterized in that the inlet (2) opens into at least one nozzle (4) which is arranged above the level (N) and is pointed downward and configured to jet fresh water (W) directly into an interface region between the level (N) and suction end (7) and directly to a surface of received water to form turbulence(s) in the received water while the container remains open and uncovered.

2. The apparatus according to claim 1, wherein the volume of the container (1) is between 1 and 10 liters, and/or wherein a feed rate is between 15 and 25 liters/minute.

3. The apparatus according to claim 1, wherein a diameter of the container (1) is not more than 30 cm, and/or wherein the level control (3) is arranged to maintain a level (N) of 8 to 15 cm.

4. The apparatus according to claim 1, wherein the inlet (2) opens into a plurality of nozzles (4).

5. The apparatus according to claim 4, wherein the nozzles (4) are arranged in a vertical and/or circumferential direction on a container inner wall (5).

6. The apparatus according to claim 1, wherein the at least one nozzle (4) and the level control (3) are connected to each other and displaceable in a vertical direction.

7. The apparatus according to claim 1, comprising a carrying handle (6) which is located above the inlet (2), the carrying handle (6) being fixedly connected to the container (1) and shaped so that a gripping surface is located above the center of gravity of the container (1).

8. The apparatus according to claim 1, wherein the at least one nozzle (4) is configured to generate air bubbles and maintain movement of the received water in the container (1) from the turbulence(s).

9. The apparatus according to claim 1, wherein the at least one nozzle (4) is configured to generate air bubbles and maintain movement of the received water in the container (1) from the turbulence(s).

10. A device for cleaning inner lines and suction end (7) of airless sprayers (13), the suction end (7) being positioned upstream of he-an airless sprayers' (13) high-pressure pump, the device comprising an inlet (2) which can be connected to a water supply, wherein the device is provided for interacting with an upwardly open container (1) without a cover and having a volume between 0.5 and 20 liters, into which the suction end (7) of the airless sprayer (13) can be inserted, for receiving fresh water (W) flowing out of the inlet (2) and remains open during cleaning, and has a level control (3), by means of which a level (N) of the fresh water (W) in the container (1) can be maintained at a predetermined value (X), characterized in that the inlet (2) opens into at least one nozzle (4) which is arranged above the level (N) and is pointed downward and configured to jet fresh water (W) directly into an interface region between the level (N) and the suction end (7) and directly to a surface of received water in order to form turbulence(s) in the received water while the container remains open and uncovered.

11. A system for cleaning airless sprayers (13), comprising the device according to claim 10, further comprising a reprocessing device (11) for reprocessing gray water flowing from the downstream end of the high pressure pump of the airless sprayer (13).

12. A method for cleaning airless sprayers (13) according to the system of claim 11, comprising the following steps:
   providing a container (1) for holding freshwater (W);
   inserting the suction end (7) of the airless sprayer (13) into the container (1);
   filling the container (1) with fresh water (W) up to a predetermined value (X) of the level (N);

switching on the high-pressure pump of the airless sprayer (13) so that fresh water (W) is conveyed out of the container (1) and through the airless sprayer (13), thus reducing the level (N);

detecting the reduction of the level (N) by means of a suitable measurement unit (8);

opening an inlet (2) of fresh water (W) into the container (1) by means of a control unit (9) connected to the measurement unit (8), so that the level (N) rises again;

detecting the reaching of the predetermined value (X) of the level (N) and closing the inlet (2);

so that, despite the continuous withdrawal of fresh water (W) by the airless sprayer (13), the level (N) of the fresh water (W) in the container (1) remains substantially constant, characterized in that fresh water (W) is jetted to form turbulences into the interior of the container (1) by means of at least one suitable nozzle (4) arranged downstream as well as above the level (N) of the inlet (2), so that a suction end (7) of the airless sprayer (13) inserted therein is freed from residues of liquids adhering there, and/or sediments otherwise settling on the bottom of the container (1) are swirled up and drawn in by the airless sprayer (13), and/or already contaminated water (W) is diluted and conveyed out of the container (1).

13. The method according to claim 12, wherein the gray water flowing from the end of the airless sprayer (13) located downstream of the high-pressure pump is supplied to a reprocessing unit (11).

* * * * *